United States Patent [19]

Röhringer et al.

[11] Patent Number: 5,168,948

[45] Date of Patent: Dec. 8, 1992

[54] ALL-WHEEL STEERING FOR MOTOR VEHICLES

[75] Inventors: Arno Röhringer, Ditzingen; Günter Wörner, Kernen, both of Fed. Rep. of Germany

[73] Assignee: Mercedes-Benz AG, Fed. Rep. of Germany

[21] Appl. No.: 684,158

[22] Filed: Apr. 12, 1991

Related U.S. Application Data

[63] Continuation of Ser. No. 403,463, Sep. 6, 1989, abandoned.

[30] Foreign Application Priority Data

Sep. 7, 1988 [DE] Fed. Rep. of Germany ....... 3830374
Oct. 22, 1988 [DE] Fed. Rep. of Germany ....... 3836020

[51] Int. Cl.⁵ .......................... B62D 5/00; B62D 6/00; B62D 7/14
[52] U.S. Cl. ........................................ 180/140; 280/91
[58] Field of Search ........................... 180/140; 280/91

[56] References Cited

U.S. PATENT DOCUMENTS

| 4,687,214 | 8/1987 | Uno | 280/91 |
|---|---|---|---|
| 4,687,216 | 8/1987 | Kawamoto et al. | 280/91 |
| 4,716,981 | 1/1988 | Murao | 180/140 |
| 4,758,012 | 7/1988 | Ogura et al. | 280/91 |
| 4,772,036 | 9/1988 | Sano et al. | 280/91 |
| 4,805,939 | 2/1989 | Kanazawa et al. | 280/91 |
| 4,828,064 | 5/1989 | Furutani et al. | 180/140 |
| 4,834,204 | 5/1989 | Ito et al. | 180/140 |
| 4,836,566 | 6/1989 | Birsching | 280/91 |
| 4,874,183 | 10/1989 | Chikuma et al. | 280/91 |
| 4,953,652 | 9/1990 | Ohmura et al. | 180/140 |
| 4,976,328 | 12/1990 | Ohmura | 180/140 |
| 5,014,801 | 5/1991 | Hirose | 180/140 |

FOREIGN PATENT DOCUMENTS

| 0154991 | 3/1985 | European Pat. Off. . |
|---|---|---|
| 0225773 | 6/1987 | European Pat. Off. . |
| 3711618 | 10/1987 | Fed. Rep. of Germany . |
| 2557058 | 6/1985 | France . |
| 92261 | 5/1984 | Japan . |
| 169312 | 9/1985 | Japan . |
| 2170452 | 8/1986 | United Kingdom . |
| 2188600 | 10/1987 | United Kingdom . |

*Primary Examiner*—Mitchell J. Hill
*Attorney, Agent, or Firm*—Evenson, Wands, Edwards, Lenahan & McKeown

[57] ABSTRACT

A rear wheel steering is operated by a mechanical gear, which is connected on an input side to a front wheel steering. The gear has a controllable transmission ratio, a control element controlling the transmission being adjusted against spring force by a self locking free positioning motor. In the event of failure of a control unit operating the positioning motor as a function of the travelling speed, a maximum transmission ratio for deflection in the same direction of the front wheels and rear wheels is set by spring force.

8 Claims, 8 Drawing Sheets

ALL-WHEEL STEERING FOR MOTOR VEHICLES

This is a continuation of U.S. patent application Ser. No. 07/403,463, filed Sep. 6, 1989 now abandoned.

The present invention relates to an all wheel steering arrangement for motor vehicles. The steering angle of the rear wheel steering is controlled as a function of the steering angle of the front wheels and the travelling speed of the motor vehicle in such a way that the rear wheels are steered in a direction opposite to that of the front wheels at low travelling speed, and in the same direction as the front wheels at higher travelling speed (in each instance with smaller steering angles compared with the front wheels). Steering gear elements of the front wheels are coupled to steering gear elements of the rear wheels via a mechanical coupling mechanism having a transmission ratio which can be varied infinitely between positive and negative maximum ratios under control of a non-self-locking, free positioning motor.

All wheel steering systems are known. Due to the turning of front and rear wheels in opposite directions at low travelling speed, the turning ability of the vehicle in maneuvering operations or in slow travel is improved considerably. Turning the wheels in the same direction as the front wheels at high travelling speed greatly enhances driving stability, particularly in obstacle avoidance maneuvers, in which the steering is deflected strongly to one side and then to the other side in rapid succession.

Because control of the transmission ratio between the steering angles of the front and rear wheels (more particularly, the polarity of the steering directions of the rear wheels relative to the steering direction of the front wheels) is automatic, precautions must be taken to deal with possible malfunction of the automatic control of the mechanical coupling determining the transmission ratio.

In this context, Japanese Published Application 59-92261 discloses an all wheel steering of the type specified above, in which the gear element controlling the transmission is brought by springs into a neutral position wherein the rear wheels remain in their straight-ahead position, independently of the respective steering angle of the front wheels.

The all wheel steering mechanism disclosed by European Patent Specification 0,154,991 also operates in the same way.

A further all wheel steering arrangement is described in German Patent Document DE-OS 3 711 618 in which the drive of the gear element which controls the transmission ratio between the steering angles of the front and rear wheels is designed to be self-locking. That is, in the event of a fault the transmission ratio last set is retained.

All these above-described all wheel steering systems are problematic from the perspective of safety in the event of a fault in the control system for the rear wheel steering mechanism. That is, in the event of a failure, as a rule, a direct steering behavior is established, which is uncustomary for the most frequent travelling speeds. With the rear wheels remaining constantly in their straight-ahead position, the vehicle responds particularly strongly to a change in the steering angles of the front wheels at travelling speeds at which a deflection of the rear wheels in the same direction as the front wheels was in fact intended.

A similar situation also applies if the automatic gear control fails at moderate or very low speeds and the transmission ratio last set in that particular case is maintained unchanged.

Therefore, it is an object of the present invention to provide an all wheel steering of the type specified above which affords particularly safe and trouble free vehicle handling, even in the event of failure of an automatic system having speed dependent control over the rear wheels.

This and other objects are achieved according to the present invention by a spring arrangement biased to urge a mechanical coupling element controlling the transmission (or an element positively coupled thereto) into a position in which the mechanical coupling mechanism effects a control of front wheels and rear wheels in the same direction at a maximum transmission ratio.

Due to the arrangement according to the invention, in the event of a failure or fault of the automatic control system for the speed-dependent steering of the rear wheels, it suffices to simply switch off the self locking, free positioning motor which controls the transmission ratio. The spring arrangement then places the mechanical coupling mechanism in the desired end position in which the rear wheels are steered in the same direction as the front wheels at maximum transmission ratio.

In the case of a malfunction, the spring arrangement thus ensures operating performance of the all wheel steering such as normally applies only at a high travelling speed. Consequently, maximum safety is provided under all circumstances. This result is achieved at the expense of some degree of comfort inasmuch as the steering at reduced travelling speed is more indirect than would be the case with faultless speed dependent control of the rear wheels. In addition, a diminished turning ability of the vehicle must be accepted, in particular in maneuvering operations.

According to a preferred embodiment of the present invention, an output of the steering gear of the front wheels leading to the rear wheel steering allows the transmission of only a limited force or torque, thus providing a particularly simple mechanism to assure that rear wheels can reach their maximum steering lock before the front wheels are locked to their maximum position.

In addition, in this way the maximum steering resistance, which acts against a manual operation of the vehicle steering, can be limited This is important in particular whenever the rear wheel steering is supported by a servo unit. In the event that the servo unit fails, only a limited increase in the steering resistance can occur. If, forces or torques which exceed the maximum transmittable torque or force become necessary for operating the rear wheel steering, the latter is not operated any further.

In addition, it is expedient to bias the rear wheel steering resiliently into a straight ahead position. This prevents play between the gear elements of the front wheel steering and the gear elements of the rear wheel steering from leading to uncontrolled steering movements of the rear wheels.

The mechanical coupling mechanism controlling the transmission ratio between the front and rear wheels may be designed to convert a rotational stroke on the input side into a translatory movement on the output side, by a joint axle, a joint pin or the like, which drives a linearly displaceable element transverse to the axis of rotation on a radial path which extends on both sides of the axis of rotation. A positioning motor controls the position of the joint axle or joint pin relative to the displaceable part or the rotational part.

In a particularly preferred embodiment of the invention, the mechanical coupling mechanism converts a rotational motion on the input side into a displacive stroke on the output side, the input side rotational stroke being predetermined by or dependent on the steering angle of the front wheels. The input side rotational part is coupled to a further rotational part having an axle arranged eccentrically and parallel to the axle of the input side rotational part, by a joint part, which is guided in a radial path on the rotational parts. The distance of the joint part from the axle of the input side rotational part is variable under control of a positioning motor, and by a wheel mounted on the further rotation part at a distance from the axis of rotation of the latter. The wheel turns in a stationary circular path, central with respect to the axis of rotation of the further rotational part, and is coupled by means of an eccentrically arranged joint pin to a strut which is displaceable transversely to the axes of rotation. The strut forms the output element of the mechanical coupling mechanism. In this embodiment, the maximum displacive stroke of the output side strut is limited by the kinematics of the gear elements. If the diameters of the circular path and of the wheel are dimensioned correspondingly, it is possible that at very large steering angles of the front wheels, the rear wheels are deflected counter to the front wheels without additional operation of the positioning motor.

For control of the transmission, a hydraulic displacer or piston cylinder unit may be utilized. However, other positioning motors are also possible, for example those which operate electromagnetically.

Other objects, advantages and novel features of the present invention will become apparent from the following detailed description of the invention when considered in conjunction with the accompanying drawings.

DETAILED DESCRIPTION OF THE DRAWINGS

Figure 1:
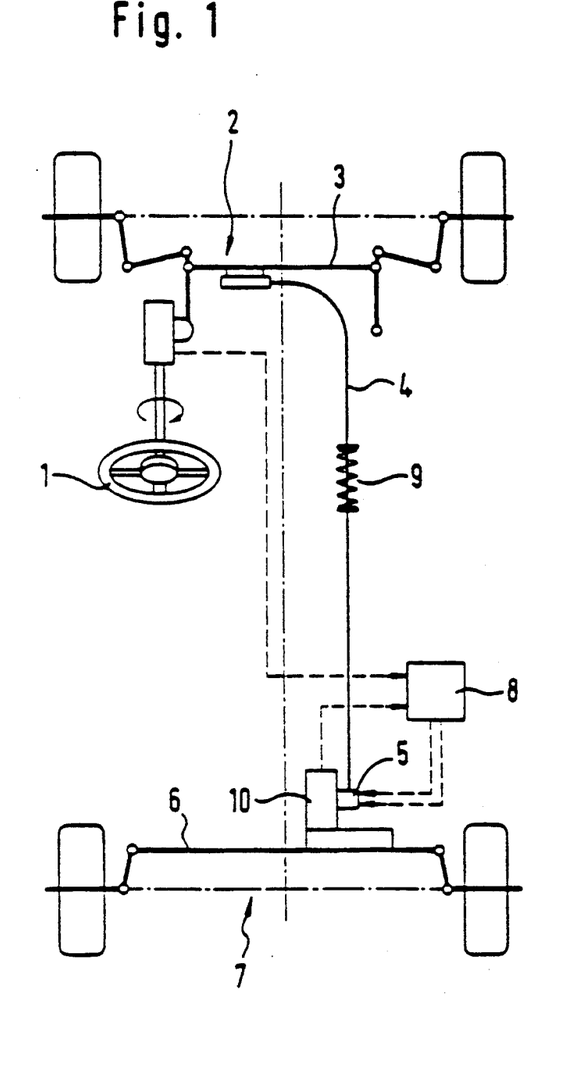
FIG. 1 shows an overall schematic representation of the all wheel steering according to the invention.

Referring to FIG. 1, a vehicle has a typical servo-assisted front wheel steering 2, operated by steering wheel 1. A steering gear element 3 of the front wheel steering 2 is connected, for example, by a Bowden cable arrangement 4, (or by other gear elements, such as a linkage arrangement), to an input side of mechanical coupling mechanism 5, an output side of which is coupled to a gear element 6 of a rear wheel steering 7.

The magnitude and polarity of the transmission ratio of the mechanical coupling mechanism 5 can be varied by a control unit 8 as a function of the travelling speed of the vehicle such that front wheel steering 2 and rear wheel steering 7 are operated in opposite direction (negative transmission ratio) at very low speeds in order to increase the turning ability of the vehicle in maneuvering operations. At higher travelling speeds, front wheel steering 2 and rear wheel steering 7 operate in the same direction (positive transmission ratio). The steering angles of the rear wheel steering 7, of course, remains small in comparison with the steering angles of the front wheel steering 2. At a moderate transitional speed, the rear wheel steering 7 remains unoperated, i.e., the transmission ratio of the mechanical coupling mechanism 5 is adjusted to the value zero.

A force limiter 9 may be installed in the Bowden cable arrangement 4, so that only limited forces or torques can be transmitted to the mechanical coupling mechanism 5.

A servo unit or servo motor, coupled to the output side of the mechanical coupling mechanism 5, may be arranged between the gear element 6 and the mechanical coupling mechanism 5. An output of the servo unit 10 is provided to the gear unit 6 of the rear wheel steering 7. The input and output elements of the servo unit 10 are slightly movable relative to each other, in a manner that is known per se, the servo unit 10 being designed to adjust the output element (as a rule hydraulically) to a central or set position relative to the input element.

Figure 2:
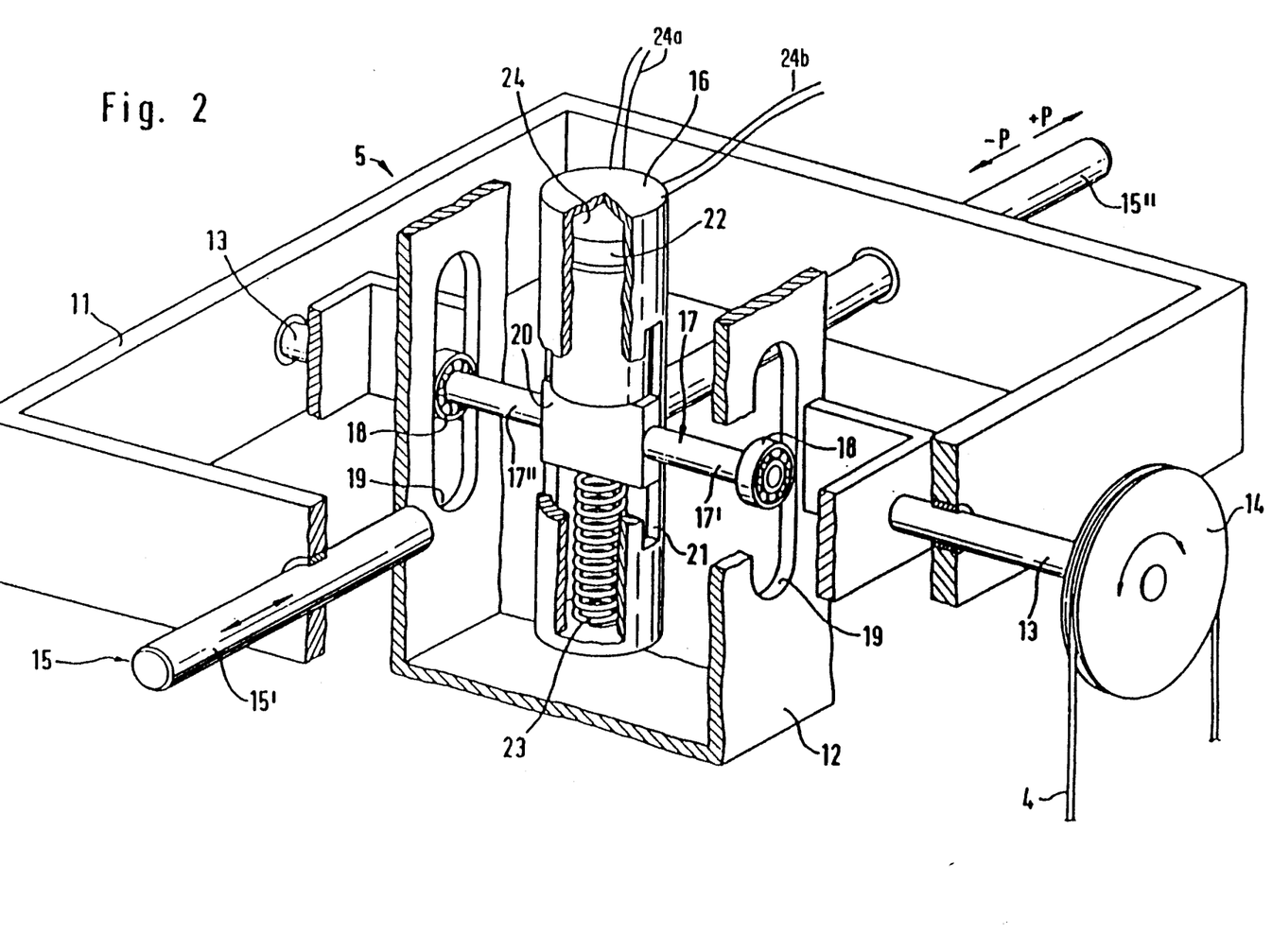
FIG. 2 shows a first advantageous embodiment of the mechanical coupling mechanism controlling the transmission ratio between steering angle of the front and rear wheels.

In the embodiment of FIG. 2, the mechanical coupling mechanism 5 has a frame-like housing 11, fixed to the vehicle. A swing frame is fixedly mounted on axle journals 13 which in turn are journaled into the housing 11. The swing from 12 is connected by a wheel 14, arranged fixedly on one axle journal 13, to the Bowden cable arrangement (cf. FIG. 1) which constitutes the input to the mechanical coupling mechanism 5. Thus if the front wheel steering 2 is turned in one direction, the swing frame 12 turns relative to the housing 11 in a first direction. Upon operation of the front wheel steering 2 in the other direction, the swing frame 12 likewise turns in the other direction.

The output of the mechanical coupling mechanism 5 is provided by means of a compression strut 15. Strut parts 15' and 15" of the compression strut are arranged transversely to the axle journals 13 on both sides of a cylinder housing borne by the compression strut 15. The cylinder housing 16 is thus always displaced together with the compression strut 15 in the direction indicated by the arrows −P, +P in FIG. 2.

A joint axle 17, is arranged parallel to the axle journals 13, and is transversely displaceably in elongated slots 19 on the swing frame 12 by rollers 18 arranged at ends thereof. Joint axle 17 serves as the drive coupling between the swing frame 12 and the compression strut 15 or the cylinder housing 16. The elongated slots 19 extend on both sides of the axle journals 13; that is, the joint axle 17 can assume a position aligning with the axle journals 13 as well as positions offset upwards or downwards with respect to the axle journals 13.

By means of a slide 20 arranged on the joint axle 17 (connected to axle parts 17' and 17"), the joint axle 17 is displaceable transversely to the compression strut 15 as well as transversely to the axle journals 13 in guide slots 21 in the cylinder housing 16. In this arrangement, the slide 20 can be shifted downwards by means of a piston 22 accommodated in the cylinder housing 16, against the force of restoring spring 23, if the piston working space 24, closed off the bottom in the cylinder housing 16 by the piston 22, is supplied with hydraulic medium under pressure via lines 24a,b. If the piston working space 24 is relieved of the pressure, the restoring spring 23 displaces the slide 20 upward, forcing the hydraulic medium out of the piston working space 24.

If the joint axle 17 assumes the position represented in FIG. 2, aligning with the axle journals 13, the compression strut 15 remains at rest when the swing frame 12 turns, i.e., the transmission ratio of the mechanical coupling mechanism 5 has the value zero.

If the joint axle 17 is displaced upward out to the position represented in FIG. 2, the compression strut 15 is displaced in the direction of arrow +P when the wheel 14 turns clockwise and is displace in the direction of arrow −P when the wheel 14 turn anti-clockwise. The ratio between the amount of the displacement of the compression strut 15 and the amount of the rotation of the wheel 14 depends on how far the joint axle 17 is displaced upward out of the position represented in FIG. 2

If the joint axle 17 is displaced downwardly relative to the axle journals 13, the compression strut 15 is displaced in the direction of the arrow −P when the wheel 14 turns clockwise. When the wheel 14 turns anti-clockwise, the compression strut 15 is displaced in the direction of the arrow +P. Here too, the transmission ratio between the amount of the displacement of the compression strut 15 and the amount of the rotation of the wheel 14 is in turn determined by the magnitude of the downward displacement of the joint axle. Thus, upon a displacement of the joint axle 17 downward, there occurs a transmission of opposite polarity compared to a displacement of the joint axle 17 upwards; that is mutually opposed displacements of the compression strut 15 take place with the same direction of rotation of the wheel 14.

The control unit 8, shown in schematic form, is coupled to receive steering information from steering wheel 1, also shown in schematic form, and rear wheel steering information from the servo unit 10. In response to these inputs, control unit 8 controls the supply of hydraulic medium to the piston working space 25 via lines 24a, b in FIG. 2.

Figure 3:
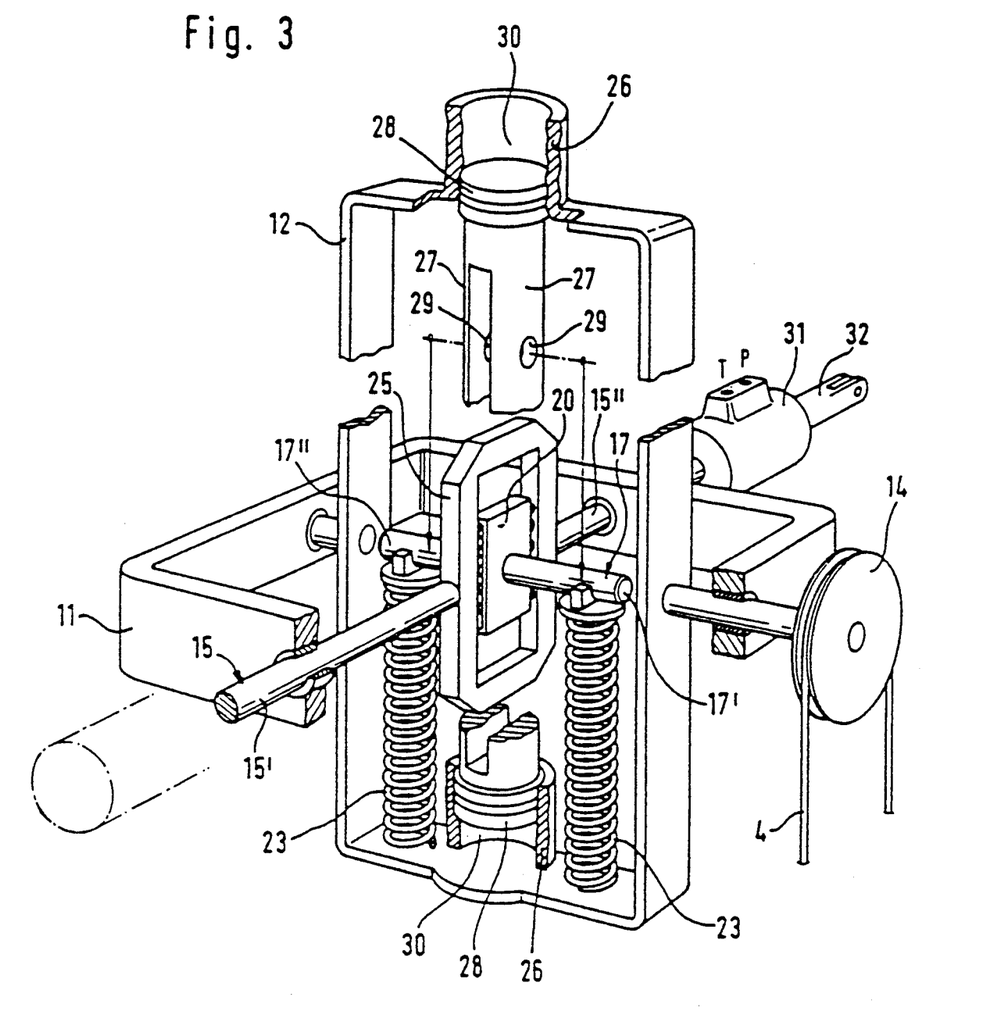
FIG. 3 shows a modified embodiment of the gear of FIG. 2.

In the embodiment of the mechanical coupling mechanism 5 represented in FIG. 3, the slide 20 is displaceable by means of play free rollers in a frame 25, which is firmly connected to the strut parts 15' and 15" of the compression strut 15.

On the swing frame 12 there are arranged mutually opposite cylinders 26, in which two mutually coaxial pistons 28, firmly connected to each other by bars 27, are displaceably guided. In the bars 27 there are bearing bores 29 for receiving axle parts 17' and 17" of the joint axle. Thus, the displaceability of the joint axle 17 relative to the swing frame 12 is ensured by the pistons 28.

Piston working spaces 30, closed off by the pistons 28 in the cylinders 26, can be supplied with a hydraulic pressure medium via hydraulic lines 24a, b as described in connection with the embodiment of FIG. 2, in order to displace the pistons 28 together with the joint axle 17, against the force of two restoring springs 23, which are restrained between the joint axle 17 and a lower transverse member of the swing frame 12 in FIG. 3. If the piston working spaces 30 are connected to each other or relieved of the pressure of the hydraulic medium, the restoring springs 23 displace the joint axle 17 upward.

Thus, also in the case of the gear represented in FIG. 3, the transmission ratio between the displacement of the compression strut 15 and the rotation of the wheel 14 is determined by the position of the joint axle 17. In the position of the joint axle 17 as shown (aligned with the axle journals 13), the transmission ratio is set to the value zero. That is, the compression strut 15 remains at rest upon rotation of the wheel 14.

By displacement of the joint axle 17 upward or downward, a greater or lesser transmission ratio of the one or other polarity is achieved as with the embodiment illustrated by FIG. 2, and as described above.

As shown in FIG. 3, the compression strut 15 or its strut part 15" can form an input to a hydraulic linear amplifier 31, such as a servo unit. A compression strut 32 arranged on an output of the servo unit has limited play relative to the strut part 15" and is urged hydraulically in into a central position relative to the strut part 15". The compression strut 32 thus follows the movements of the strut part 15", and very great adjusting forces are achievable on account of the hydraulic actuation of the compression strut 32 in comparison with the strut part 15". The housing of the linear amplifier 31 is preferably arranged fixedly on the vehicle.

A corresponding arrangement of the linear amplifier 31 is also possible in the case of the embodiments represented in FIG. 2. In the embodiments of both FIGS. 2 and 3, the strut part 15' may be coupled to a spring arrangement which biases the compression strut 15 in a well known manner into the central position represented in FIGS. 2 and 3, so that a corresponding restoring force acts in each case on the compression strut 15 upon its displacement.

Figure 4:
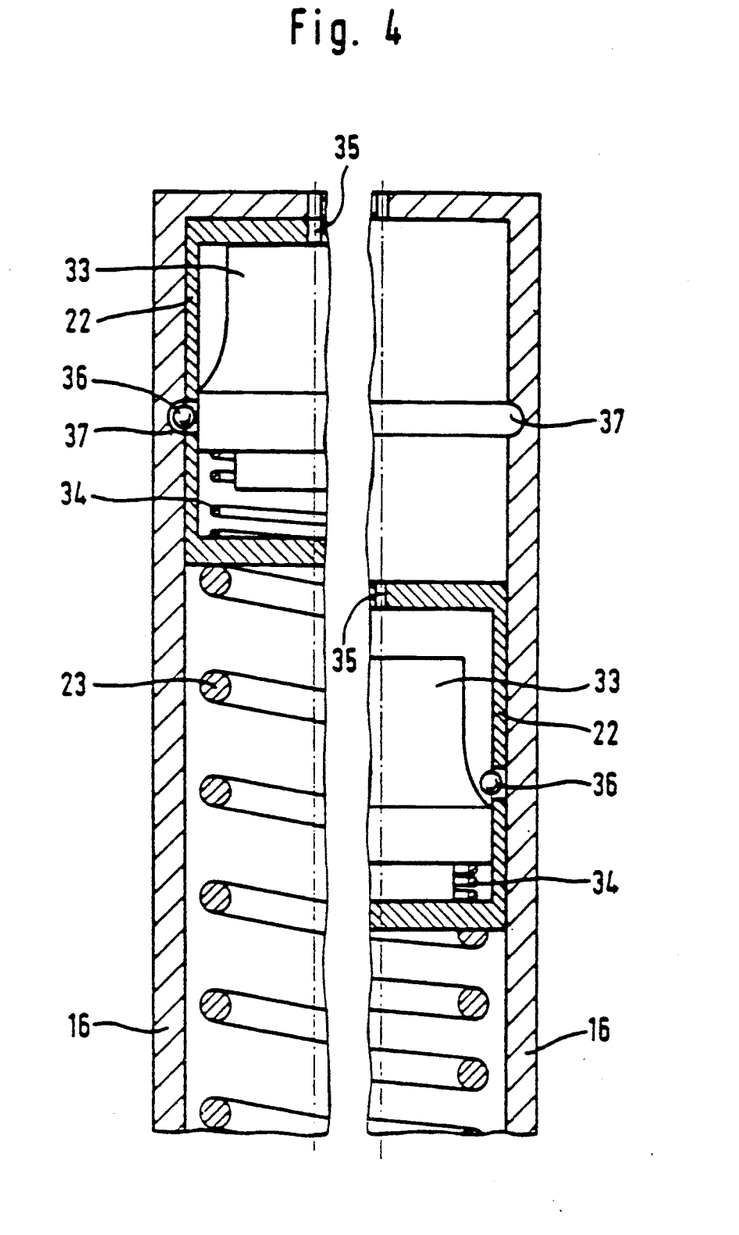
FIG. 4 shows an arresting device, with which the transmission ratio of the gear represented in FIGS. 2 and 3 can be held at a maximum value.

According to FIG. 4, the piston 22 of the embodiment represented in FIG. 2 may, if appropriate, be locked in an upper end position. For this purpose, the piston 22 is designed as a cylinder, which displaceably accommodates a further piston 33. This piston 33 is tensioned upwards by a compression spring 34 within the piston 22.

An upper head f the piston 22 in FIG. 4 has an opening 35, so that the pressure prevailing in the piston working space 24 (FIG. 2) also acts on the piston 33. The compression spring 34 is dimensioned such that the piston 33 assumes a downwardly displaced end position relative to the piston 22 whenever there is a relatively low pressure in the piston working space 24 that is insufficient to displace the piston 22 against the restoring spring 23 in the cylinder housing 16.

The piston 33 has a conically tapered upper section, which interacts with, for example, spherical interlocking members 36, secured in radial openings of the piston 22. In the upper end position of the piston 22 interlocking membranes 36 can engage with an annular groove 37 on the inner wall of the cylinder housing 16. If, in the upper end position of the piston 22, the piston 33 is displaced by compression spring 34 into its upper end position, the interlocking members 36 are pushed from the conical upper region of the piston 33 radially out of the piston 22 into the annular groove 37, and are held by a cylindrical section of the piston 33 in this position, in which the piston 22 is locked. As soon as an adequate hydraulic pressure acts via the opening 35 on the piston 33, the piston 33 is pushed downwards relative to the piston 22, so that the interlocking members 36 can in turn enter into the piston 22 unlocking the piston 22.

In FIG. 4, a locked end position of the piston 22 is represented on the left side, while an unlocked position of the piston 22 is shown on the right. In fundamentally the same way as is represented in FIG. 4 and described above, the upper piston 28 in the case of the embodiment represented in FIG. 3 may be designed so as to be lockable in an upper end position.

The all wheel steering functions according to the present invention are described in the following.

Figure 5:
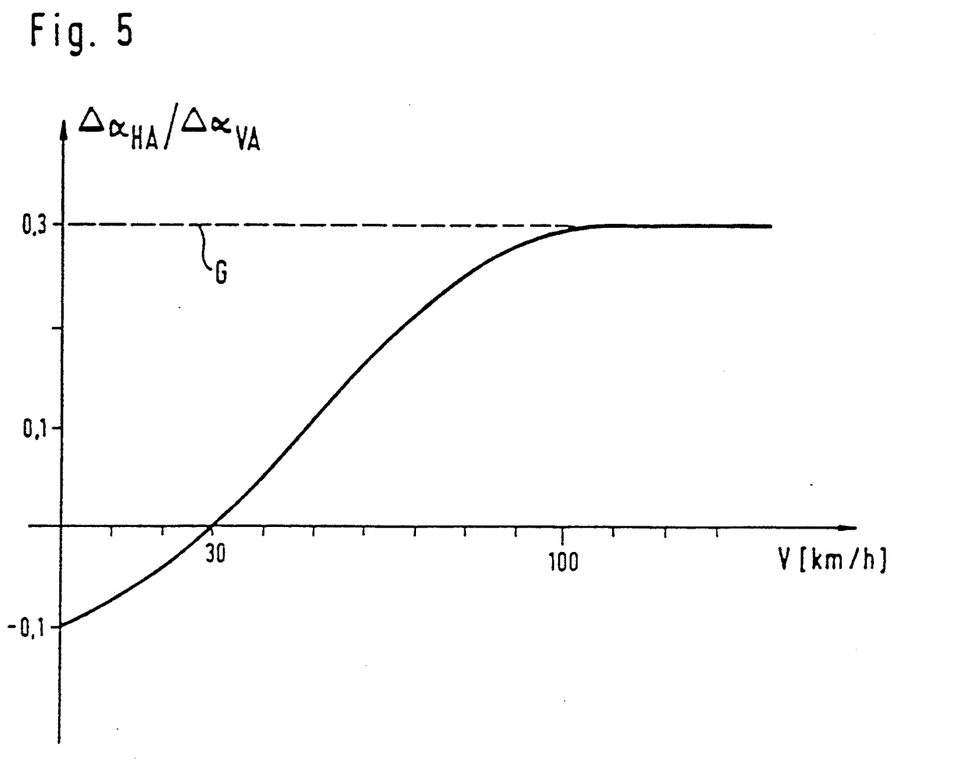
FIG. 5 is a diagram which shows the dependence of the transmission ratio between the front and wheel steering angles as a function speed.

As a function of the speed of the vehicle, the joint axle 17 in FIGS. 2 and 3 is displaced upwards or downwards, so that the transmission ratio $\Delta_a H_A/\Delta_a V_A$, represented by way of example in FIG. 5, is a function of the vehicle travelling speed V. At low speeds, (i.e., speeds below 30 km/h) a negative transmission ratio exists; that is, the rear wheels are steered in the opposite direction to the front wheels. (Similarly, a positive transmission ratio exists when the rear wheels are steered in the same direction as the front wheels.) Above speed of 30 km/h, the transmission ratio is positive and increases with increasing travelling speed to a maximum value.

The control of the transmission ratio by displacement of the joint axle 17 is effected by the control unit 8 (FIG. 1), which supplies the piston working space 24 (FIG. 2) or 30 (FIG. 3) with hydraulic medium or relieves them of hydraulic medium, in order to set the desired transmission ratio by positioning the joint axle 17. The joint axle 17 interacts with sensors (not shown), signals of which reproduce the respective actual position of the joint axle 17, and consequently the respective actual transmission ratio of the mechanical coupling mechanism 5. By electronically comparing the actual values with predetermined set values, represented by way of example in FIG. 5, a desired or necessary correction can be performed.

Figure 6:
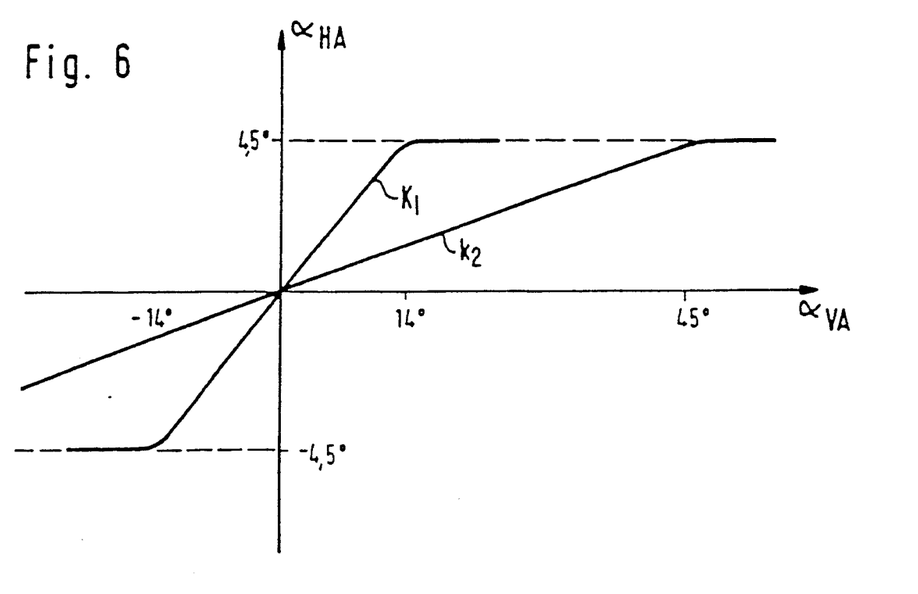
FIG. 6 is a diagram which shows the rear wheel steering angle as a function of the front wheel steering angle for various speeds of the vehicle.

FIG. 6 shows which steering angles $\alpha_{GA}$ are set in each case at the rear wheels form various speeds when the front wheel steering is operated. At high travelling speed, the rear wheels are already deflected, according to the curve $K_1$, to the maximum possible steering angle (for example 4.5°), as soon as the front wheels reach a steering angle $\alpha_{VA}$ of approximately 14°. With still further increasing steering angels of the front wheels, the steering angle of the rear wheels remains unchanged.

At lower travelling speed, on the other hand according to the curve $k_2$, the maximum value of the steering angle of the rear wheels is not reached until the front wheels also reach their maximum steering angle (for example, 45°).

Positive or negative values of the steering angles in FIG. 6 signify a deflection of the front wheels or rear wheels to the right or left.

The control unit 8 detects errors in a manner that is known in principle. If an error occurs and is detected, the piston working space 24 of the embodiment according to FIG. 2 is relieved of pressure. In the case of the embodiment according to FIG. 3, the piston working spaces 30 are relieved of pressure or are connected to each other. Accordingly, in both embodiments, the joint axle 17 is displaced upwards by the restoring spring 23 (or springs 23), it being possible, if appropriate, according to FIG. 4, for a locking of the piston 22 (FIG. 2) of the upper piston 28 (FIG. 3) to take place in the upper end position.

Accordingly, the mechanical coupling mechanism 5 provides a maximum positive transmission between front and rear wheel steering. That is, the transmission ratio in FIG. 5 remains constant, independent of the vehicle, according to the straight line G, and the rear steering operates according to curve $K_1$ in FIG. 6 upon operation of the front wheel steering. The all wheel steering thus operates in principle the same way as would be the case with faultlessly operating control unit 8 at high speed. Consequently, although the turning ability of the vehicle may possibly be impaired at low speed, safe vehicle handling is ensured.

The rear wheels can in some circumstances reach their maximum steering angle before the front wheels have reached their maximum steering angle. The wheel 14 (FIGS. 2 and 3) can of course no longer continue to turn on the input side of the mechanical coupling mechanism when the maximum steering angle of the rear wheels is reached. Therefore, in order that no destructive forces can act on the mechanical coupling mechanism 5 in such a case, the force limiter 9 according to FIG. 1 is provided in the drive transmission between the gear element 6 of the front wheel steering 2 and the mechanical coupling mechanism 5.

Figure 7:
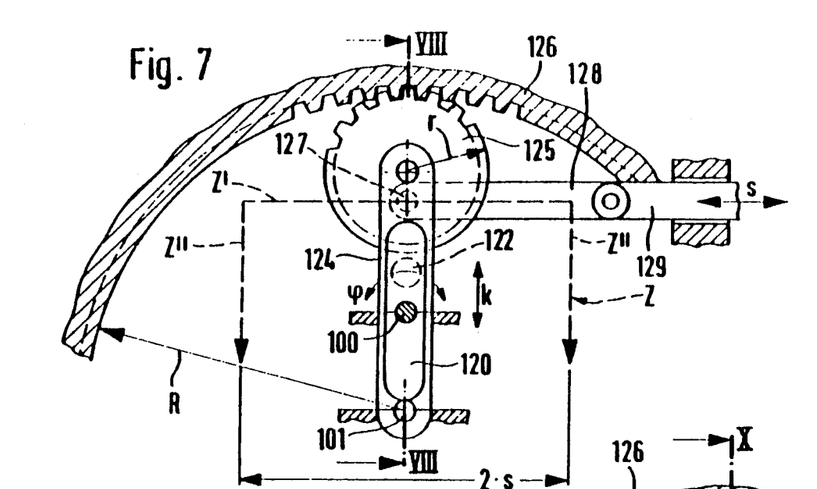
FIG. 7 shows a schematic view of a further advantageous mechanical coupling mechanism according to the invention.
Figure 8:
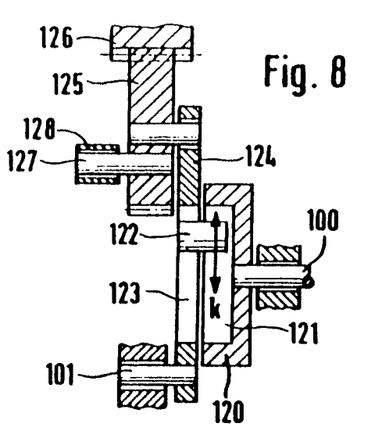
FIG. 8 is a cross-sectional view of the gear of FIG. 7, broken way along line VIII—VIII.

In the case of the gear represented in FIGS. 7 and 8, an input side rotational part 120 is pivotably mounted by an axle 100, which couples the rotational part 120 in driving terms to the front wheel steering 2 of the vehicle. On the rotational part 120 there is arranged a radial guide path 121, which extends on both sides of the axle 100 and in which a joint pin 122 is displaceably guided. The displacement takes place by means of a positioning motor (not shown), secured on the rotation part 120.

The joint 122 protrudes into a straight shifting gate 123 of a further, lever-like rotational part 124, which pivots about an axle 101 arranged substantially parallel to the axle 100 of the rotational part 120, at a greater radial distance. In the central position of the mechanical coupling mechanism, the guide path 121 and the shifting gate 123 extend like the guide path 121 in FIG. 8 upwards and downwards beyond the axle 100 of the rotational part 120.

If the joint pin 122 is put into a position aligning with the axle 100, the rotational part 124 remains at rest upon pivoting of the rotational part 120. If the joint pin 122 is displaced upwards in FIGS. 7 and 8 relative to the axle 100, upon pivoting of the rotational part 120, the rotational part 124 executes a pivoting movement in the same direction as the rotational part 120, the transmission ratio between the pivoting stroke of the rotational part 124 depending on the distance k between the axle 100 and the joint pin 122 (measured in radial direction of the axle 100). If, on the other hand, the joint pin 122 is displaced downwards relative to the axle 100 in FIGS. 7 and 8, a pivoting of the rotational part 120 effects a pivoting movement in the opposite direction of the rotational part 124, the transmission ratio between the pivoting strokes of the rotational parts 120 and 124 in turn depending on the amount of the displacement of the joint pin 122.

A toothed wheel 125, rotationally mounted on the free end of the lever like rotational part 124 meshes with a stationary toothed ring or toothed segment 126 which is central with respect to the axle 101 of the rotational part 124 and is toothed on its inside, i.e., on its concave side facing the axle 101. A connecting rod 138 is mounted on a joint pin 127 eccentrically arranged on the toothed wheel 125. A compression strut, which is displaceable transversely to the axles 100 and 101, forms the output element of the gear as shown, and is coupled to the rear wheel steering.

Upon pivoting of the rotational part 124, the joint pin 127 moves along a path which has the shape of shortened hypocycloid. If the radius R of the toothed ring 126 and the radius r of the toothed wheel 125 are related as R:r=approximately 4:1, and the joint pin 127 is disposed at approximately the distance r/2 from the axle of the toothed wheel 125, the shortened hypocycloid run through by the joint pin 127 upon pivoting of the rotational part 124 has approximately the shape of a square. The corresponding pin path is denoted by Z.

Figure 9:
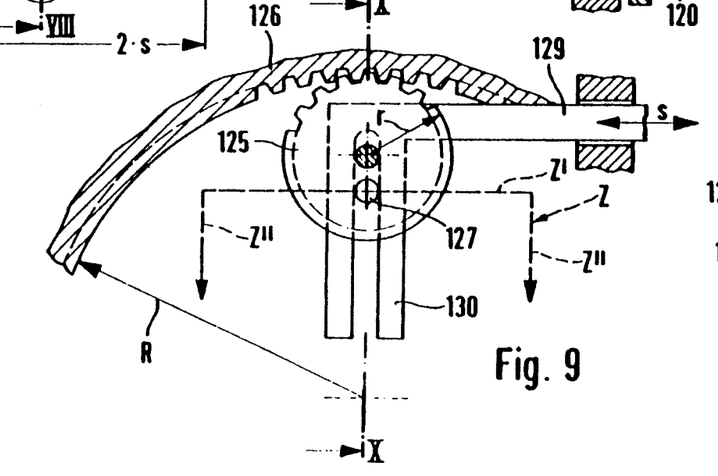
FIG. 9 shows a variant of the gear represented in FIG. 7.
Figure 10:
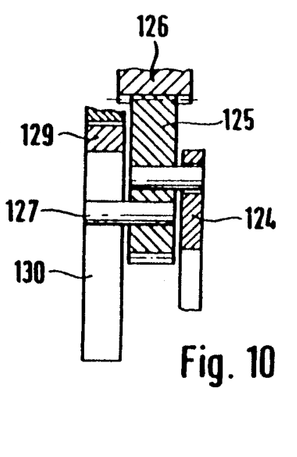
FIG. 10 is a cross sectional view of the gear in FIG. 9, broken away along X—X.

The gear shown in FIGS. 9 and 10 differs from the gear of FIGS. 7 and 8 only in that another drive connection is provided between the joint pin 127 and the compression strut 129. In the example of FIGS. 9 and 10 a shifting gate 130 arranged on the compression strut 129 extends transversely to a compression strut 129 and transversely to the axles 100 and 101, and displaceably accommodates the joint pin 127.

Figure 11:
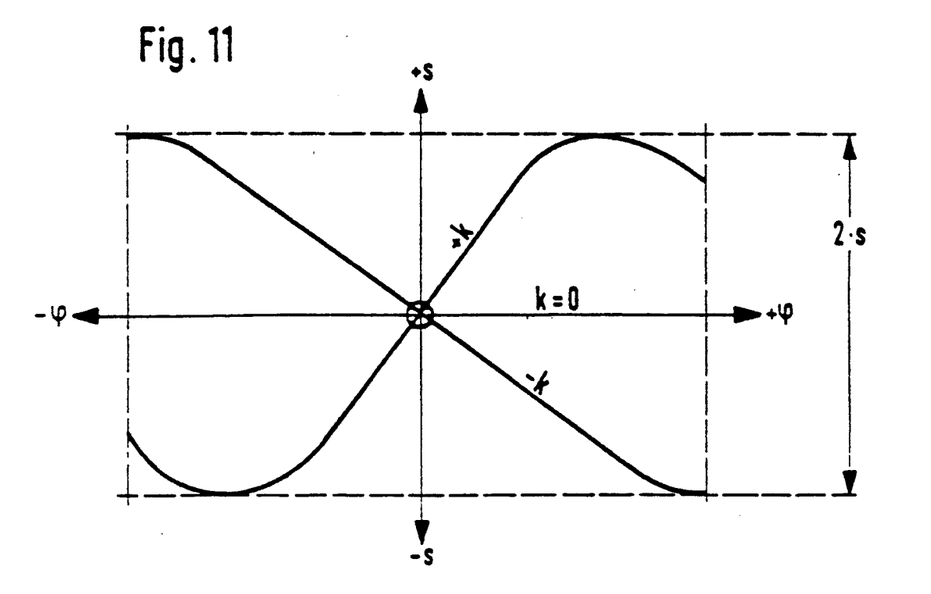
FIG. 11 is a diagram which shows the transmission functions of the gear represented in FIGS. 7 and 8.

FIG. 1 shows a diagram of the displacement s of the compression strut 129 as a function of the pivot angle φ of the input side rotational part 120 for various positions of the joint pin 122 in the guide path 121. If the joint pin 122 in FIG. 8 is displaced upwards by the maximum amount +k, the curve denoted by +k is produced. If the joint pin 122 is displaced downwards by the maximum amount −k, the curve denoted by −k is produced.

The rounded or bowed shape of these curves is caused by the influence of the connecting rod 128, since the compression strut 129 is displaced to a greater or lesser extent depending on the oblique position of the connected rod 128, the joint pin 127 moves only transversely to the displacement direction of the compression strut 129.

If the joint pin 122 aligns with the axle 100, i.e., if k=0, no displacement of the compression strut takes place. If the displacement of the joint pin 122 relative to the axle 100 lies between the values 0 and +k or 0 and −k, curves which lie between the abscissa and the curve denoted by +k or the curve denoted by −k are produced.

The maximum displacement of the compression strut 129 corresponds to the length 2 s of the section Z' of the pin path Z.

Figure 12:
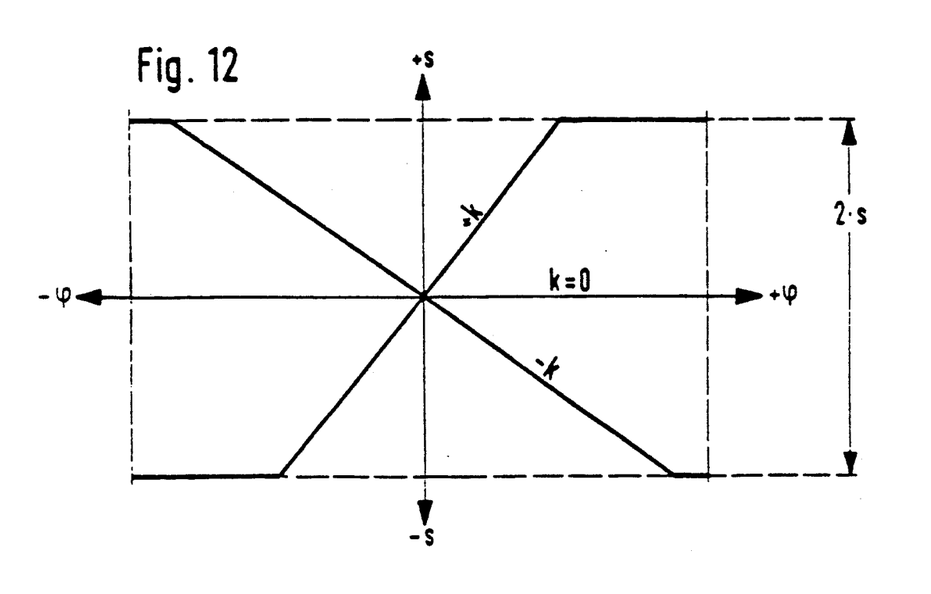
FIG. 12 is a diagram which shows the transmission functions of the gear represented in FIGS. 9 and 10.

In the case of the gear shown in FIGS. 9 and 10, the conditions shown in FIG. 12 are produced. Here, the compression strut 129 in each case remains at rest as soon as the joint pin 127 moves on the branches Z" of the pin path Z.

Under normal operating conditions, i.e., when control unit 8 (FIG. 1) operates properly, the position of the joint pin 122 is controlled by the positioning motor (not shown). When the control unit 8 malfunctions, the no--self-locking positioning motor is shut down, so that the joint pin 122 is displaced upwards as far as possible in FIGS. 7 to 10 by springs or the like (not shown). Accordingly, in such emergency operation, the gears represented in FIGS. 7 to 10 operate according to the curves denoted by +k in FIGS. 11 and 12.

When the front wheel steering is operated in a central region, the rear wheel steering operates in the same direction, the steering angles of the rear wheels remaining small however in comparison with the steering angles of the front wheels. On exceeding the central region, the steering angle of the rear wheels remains unchanged; if appropriate, the steering angle of the rear wheels can also be reduced in this case. In principle it is also possible to deflect the rear wheels in the opposite direction to the front wheels in cases of very large steering angles of the front wheels, by corresponding dimensioning of the radii R, r and d.

Figure 13:
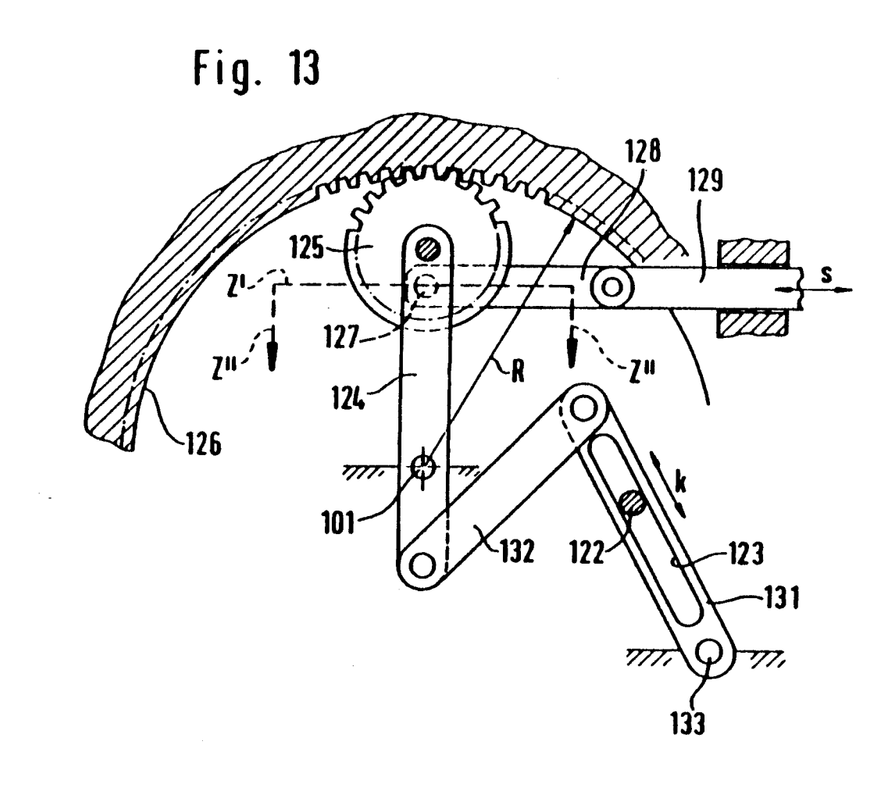
FIGS. 13 and 14 show a variant of the gear represented in FIGS. 7 and 8.
Figure 14:
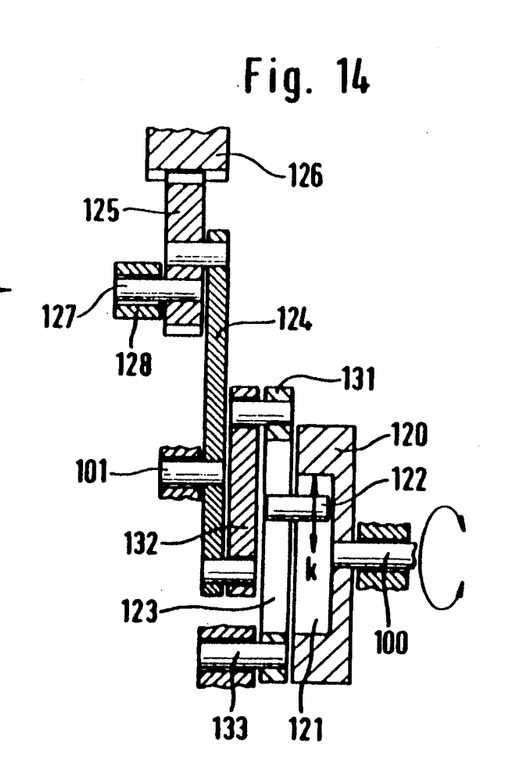

The embodiment represented in FIGS. 13 and 14 differs from the gear represented in FIGS. 7 and 8 in that rotational part 120 drives the lever-like rotational part 124 indirectly via two links 131 and 132. The joint pin 122, displaceable on the rotational part 120 in the guide path 121, protrudes into the straight shifting gate 123, which is arranged here on the link 131 pivotally mounted about an axle 133 parallel to the axle 100 of the rotational part 120. One end of the link 132 is pivotably coupled to the free end of the link 131, and the other end pivotally couple to an arm of the rotational part 124, which is designed here as a double-armed lever with the bearing axle 101. In this case the axles 101 and 33 are spaced apart from each other in such a way that the links 131 and 132 form a toggle lever-like linkage. Otherwise, the gear of FIGS. 13 and 14 correspond to the gear of FIGS. 7 and 8.

As a departure from the representation of FIGS. 13 and 14, in which the compression strut 129 is connected to the toothed wheel 125 by a connecting rod 128, the compression strut 129 may be coupled to the toothed wheel 125 by means of shifting gate 130 as in the embodiment of FIGS. 9 and 10.

With the gears shown in FIGS. 13 and 14, the transmission functions represented in FIGS. 11 and 12 can be achieved even more exactly than with the gears according to FIGS. 7 and 10.

Although the present invention has been described and illustrated in detail, it is to be clearly understood that the same is by way of limitation. The spirit and scope of the present invention are to be limited only by the terms of the appended claims.

We claim:
1. An all wheel steering system for a motor vehicle having front and rear wheels, manually operated front steering means, and rear wheel steering means, the system comprising:
transmission means for positively coupling said front wheel steering means to said rear wheel steering means, said transmission means having a transmission ratio which is infinitely variable over a range of values between a maximum positive ratio and a maximum negative ratio;
non-self-locking control means for adjusting said variable transmission ratio in response to speed of said vehicle, said transmission ratio being adjusted to said maximum positive ratio when said speed exceeds a first predetermined speed, and to said maximum negative ratio when said speed is less than a second predetermined speed which is less than said first predetermined speed;

means for detecting a malfunction of said non-self-locking control means, and for adjusting said transmission ratio to said maximum positive ratio in response thereto.

2. An all wheel steering system for a motor vehicle having front and rear wheels, manually operated front wheel steering means, and rear wheel steering means, the system comprising:

transmission means for positively coupling the front wheel steering means to the rear wheel steering means, said transmission means having a transmission ratio which is infinitely variable over a range of values between a maximum positive ratio and a maximum negative ratio;

said transmission means including non-self-locking piston means for adjusting said transmission ratio in response to position of said piston means, said piston means having a first end position wherein said transmission ratio is adjusted to said maximum positive ratio, a second end position wherein said transmission ratio is adjusted to said maximum negative ratio, and intermediate positions wherein said transmission-ratio is adjusted to a ratio that is between said maximum positive ratio and said maximum negative ratio;

spring means for biasing said piston means toward said first end position;

control means, responsive to speed of said motor vehicle, for moving said piston means to said first end position when said speed exceeds a first predetermined value, to said second end position when said speed is less than a second predetermined value which is less than said first predetermined value, and to intermediate positions when said speed is between said first and second predetermined values;

said control means having an inoperative state in which said piston means is freely displaceable by said spring means; and error detecting means for placing said control means in said inoperative state when a malfunction of the control means is detected, thereby enabling the spring means to move said piston means into said first end position.

3. An all wheel steering system according to claim 2, further comprising force limiting means for limiting an input force applied to the transmission means.

4. An all wheel steering system according to claim 2, further comprising force limiting means for limiting force transmitted between the front wheel steering means and the transmission means, the force limiting means including a pretensioned spring unit.

5. An all wheel steering system according to claim 2, further comprising means for resiliently actuating the rear wheel steering means into a straight ahead position.

6. An all wheel steering system according to claim 2, further comprising servomotor means for controlling the rear wheel steering means coupled to an output side of the transmission means.

7. An all wheel steering system according to claim 2, wherein said piston means comprises at least one of a hydraulic piston-cylinder unit for controlling the transmission ratio of the gear means.

8. An all wheel steering system according to claim 2, further comprising interlocking means for holding said piston means in said first end position thereof, said interlocking means being released from said first position by a force of the piston means counteracting said spring means.

* * * * *